United States Patent
Heckendorn et al.

(10) Patent No.: US 11,346,314 B2
(45) Date of Patent: May 31, 2022

(54) METHOD FOR PRODUCING A VALVE SEAT RING BY POWDER METALLURGY

(71) Applicant: Mahle International GmbH, Stuttgart (DE)

(72) Inventors: Heiko Heckendorn, Schopfheim (DE); Alexander Mueller, Wildberg (DE); Roland Scholl, Laufenburg (DE); Klaus Wintrich, Schopfheim (DE)

(73) Assignee: Mahle International GmbH

( * ) Notice: Subject to any disclaimer, the term of this patent is extended or adjusted under 35 U.S.C. 154(b) by 660 days.

(21) Appl. No.: 16/157,074

(22) Filed: Oct. 10, 2018

(65) Prior Publication Data

US 2019/0105714 A1 Apr. 11, 2019

(30) Foreign Application Priority Data

Oct. 11, 2017 (DE) .......................... 102017218123.0

(51) Int. Cl.
*F02M 63/00* (2006.01)
*F01L 3/02* (2006.01)
(Continued)

(52) U.S. Cl.
CPC ....... *F02M 63/0077* (2013.01); *B22F 1/0003* (2013.01); *B22F 3/16* (2013.01); *B22F 5/008* (2013.01); *B22F 5/106* (2013.01); *B23K 35/0244* (2013.01); *C22C 33/0285* (2013.01); *C22C 38/02* (2013.01); *C22C 38/08* (2013.01); *C22C 38/12* (2013.01); *C22C 38/18* (2013.01); *F01L 3/02* (2013.01); *F02M 51/0675* (2013.01); *B22F 2301/15* (2013.01); *B22F 2304/10* (2013.01); *B22F 2998/10* (2013.01); *B22F 2999/00* (2013.01); *C22C 38/34* (2013.01); *F01L 2301/00* (2020.05); *F01L 2303/00* (2020.05); *F01L 2810/02* (2013.01)

(58) Field of Classification Search
None
See application file for complete search history.

(56) References Cited

U.S. PATENT DOCUMENTS 4,599,110 A * 7/1986 Kohler ................ C22C 33/0285
                                                      75/243
9,702,277 B2   7/2017 Kohler et al.
(Continued)

FOREIGN PATENT DOCUMENTS

DE        10336407 A1    3/2005
DE   102005001198 A1    7/2006
(Continued)

OTHER PUBLICATIONS

English abstract for DE-102013210895.
English abstract for DE-10336407.

*Primary Examiner* — Xiaobei Wang
(74) *Attorney, Agent, or Firm* — Fishman Stewart PLLC

(57) ABSTRACT

A method for producing a valve seat ring via powder metallurgy may include compacting a powder mixture including 4% by weight to 16% by weight particles of cobalt to form the valve seat ring. The method may also include sintering the powder mixture after compacting the powder mixture. Before compacting the powder mixture, 80% of the particles of cobalt may have a particle diameter of approximately 4.4 μm to 17.5 μm.

17 Claims, 1 Drawing Sheet

(51) Int. Cl.
*C22C 33/02* (2006.01)
*B22F 1/00* (2022.01)
*C22C 38/02* (2006.01)
*C22C 38/12* (2006.01)
*C22C 38/08* (2006.01)
*C22C 38/18* (2006.01)
*F02M 51/06* (2006.01)
*C22C 38/34* (2006.01)
*B22F 3/16* (2006.01)
*B22F 5/00* (2006.01)
*B22F 5/10* (2006.01)
*B23K 35/02* (2006.01)

(56) References Cited

U.S. PATENT DOCUMENTS

| | | | |
|---|---|---|---|
| 2009/0123690 | A1 | 5/2009 | Scholl et al. |
| 2013/0220263 | A1* | 8/2013 | Lehrkamp ............. C22C 38/001 123/188.3 |
| 2016/0375494 | A1 | 12/2016 | Beerens et al. |
| 2018/0209311 | A1* | 7/2018 | Heckendorn ........... B22F 5/106 |

FOREIGN PATENT DOCUMENTS

| | | |
|---|---|---|
| DE | 102012013226 A1 | 1/2014 |
| DE | 102013210895 A1 | 12/2014 |
| DE | 102015211623 A1 | 12/2016 |
| DE | 102015213706 A1 | 1/2017 |

* cited by examiner

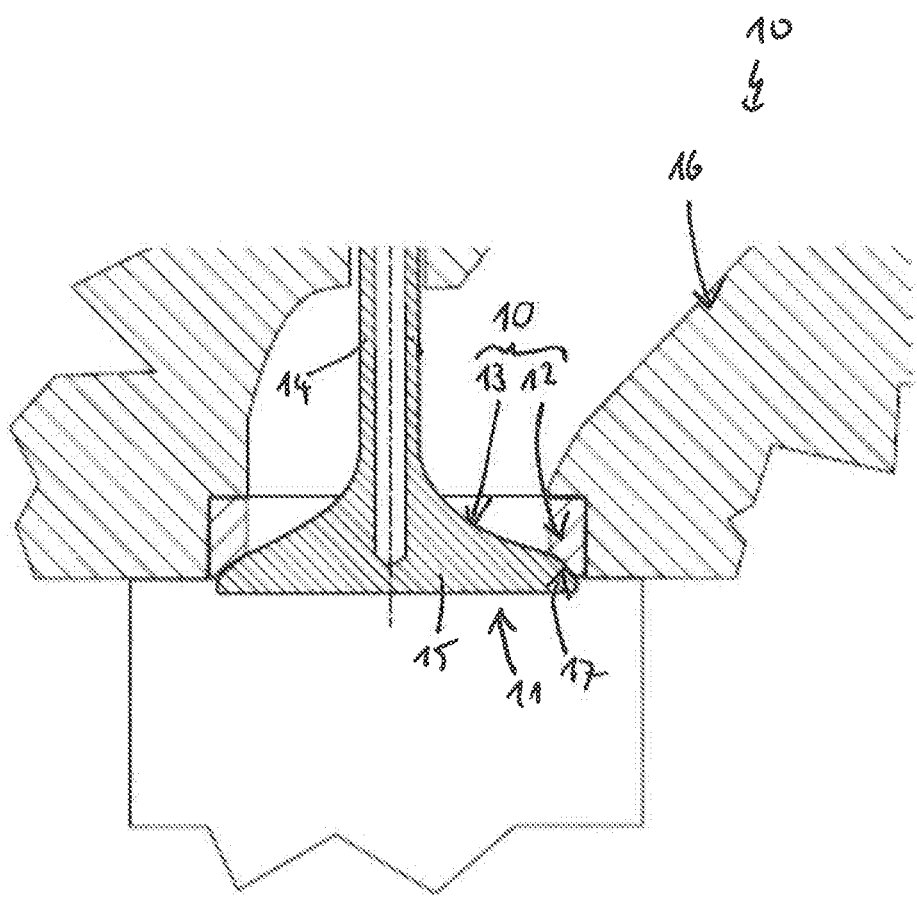

METHOD FOR PRODUCING A VALVE SEAT RING BY POWDER METALLURGY

CROSS-REFERENCE TO RELATED APPLICATIONS

This application claims priority to German Patent Application No. DE 10 2017 218 123.0, filed on Oct. 11, 2017, the contents of which are hereby incorporated by reference in its entirety.

TECHNICAL FIELD

The invention relates to a method for producing a valve seat ring by powder metallurgy, and a valve seat ring which is produced by carrying out this method. The invention further relates to a tribological system with such a valve seat ring, and an internal combustion engine with such a tribological system.

BACKGROUND

It is known to produce valve seat rings for inlet and outlet valves of internal combustion engines by powder metallurgy. Such power-metallurgical production methods enable a high-precision manufacture, which requires only few finishing steps. At the same time also constituents which are otherwise only able to be admixed with difficulty, for example lubricating and anti-friction means, can be added in a simple manner by powder metallurgy.

Such a powder-metallurgical production method is known from DE 103 36 407 A1.

SUMMARY

It is an object of the present invention to provide an improved production method for valve seat rings which are produced by powder metallurgy. In particular, by means of such a method, valve seat rings are to be produced with improved wear characteristics, so that the created valve seat rings also have an increased lifespan when they are used in an internal combustion engine.

This problem is solved by the subject matter of the independent claim(s). Preferred embodiments are the subject matter of the dependent claim(s).

In the method according to the invention for producing a valve seat ring by powder metallurgy, a powder mixture, which contains between 4% by weight and 16% by weight particles of cobalt, is compacted to form the valve seat ring and is subsequently sintered. According to the invention, 80% of the particles of cobalt which are contained in the powder mixture have a particle diameter of between 4.4 µm and 17.5 µm before compacting. Wear tests with the valve seat ring produced in this way have shown that the latter has a distinctly increased wear resistance compared to conventional valve seat rings produced by powder metallurgy. This characteristic is also accompanied by an increased lifespan of the produced valve seat ring.

Particularly good wear characteristics are achieved in the valve seat ring produced by means of the method according to the invention when 80% of the particles of cobalt which are contained in the powder mixture have a particle diameter of between 6.5 µm and 12 µm before compacting.

According to a preferred embodiment of the method, between 0% by weight and 40% by weight of the starting material are formed by at least one hard phase based on iron, cobalt or molybdenum, which are contained in the starting material as an admixture. Preferably, two or more of the named hard phases can be contained in the starting material. The admixing of at least one hard phase increases the hardness of the valve seat ring produced by means of the method.

Particularly preferably, between 0% by weight and 3% by weight of the starting material are formed by at least one solid lubricant. Said solid lubricant is contained as an admixture in the starting material. Particularly preferably, several such solid lubricants are contained in the starting material.

Expediently, between 0% by weight and 5.5% by weight of the starting material can be formed respectively by an admixture of copper, bronze, brass, ferro phosphorus (FeP) and/or graphite.

Particularly expediently, the starting material can contain between 0% by weight and 7% by weight copper.

In an advantageous further development, between 0% by weight and 5.5% by weight of the starting material are formed respectively by a pressing agent and/or a flow improver.

According to a further preferred embodiment, the starting material contains an iron-based powder, which has the following constituents: 0 to 3% by weight Cr, 0 to 1.5% by weight Si, 0 to 4% by weight Ni, 0 to 3.5% by weight V, 0 to 2.5% by weight W, 0 to 2.5% by weight Mo.

Preferably, the starting material has, in addition, one or more of the following constituents: graphite, MnS, FeP, $CaF_2$, $MoS_2$.

The invention further relates to a tribological system with a previously presented valve seat ring and with a valve body for closing a valve opening which is surrounded by the valve seat ring. The previously explained advantages of the method according to the invention therefore transfer to the tribological system according to the invention.

According to a preferred embodiment, the material of the valve body comprises or is X45CrSi-9.

Expediently, the valve seat ring can be nitrided and/or hardened.

According to a preferred embodiment, the valve body comprises a valve shaft and a valve plate, wherein the valve plate is hardened and/or nitrided in a contact portion in which it lies against the valve seat ring for closing the valve opening.

The invention further relates to an internal combustion engine for a motor vehicle. The internal combustion engine comprises a previously presented tribological system, wherein the valve opening and the valve seat ring of the tribological system are provided on a cylinder head of the internal combustion engine. The previously explained advantages of the internal combustion engine according to the invention therefore also transfer to the tribological system according to the invention.

Further important features and advantages of the invention will emerge from the subclaims, from the drawings and from the associated FIGURE description with the aid of the drawings.

It shall be understood that the features mentioned above and to be explained further below are able to be used not only in the respectively indicated combination, but also in other combinations or in isolation, without departing from the scope of the present invention.

BRIEF DESCRIPTION OF THE DRAWINGS

Preferred example embodiments are illustrated in the drawings and are explained further in the following description.

The single FIGURE shows a diagrammatic, highly simplified illustration of the structure of a tribological system according to the invention.

DETAILED DESCRIPTION

The single FIGURE shows in a diagrammatic, highly simplified illustration the structure of a tribological system 10 according to the invention, which can be used in a cylinder head 16 of an internal combustion engine of a motor vehicle. The tribological system 10 comprises a valve opening 11, which can be closed by means of a valve body 13. The FIGURE shows the valve body 13 in a closed position. X45CrSi-9 can be used as material for the valve body 13. The valve body 13 comprises a valve shaft 14, which continues axially into a valve plate 15. The valve opening 11 is surrounded by a valve seat ring 12.

In a closed position shown in the FIGURE, the vale plate 15 closes the valve opening 11. For this, the valve plate 15 lies with a contact portion 17 against the valve seat ring 12. The valve seat ring 12 can be nitrided and hardened in this way.

The valve seat 12 was produced by means of the method according to the invention, therefore by powder metallurgy. In the method according to the invention for the production of the valve seat 12, a powder mixture which contains between 4% by weight and 16% by weight particles of cobalt is compacted to form the valve seat ring. The compacting can take place by means of a pressing process. The compacted powder mixture is subsequently sintered. Instead of a sintering process, a hot rolling of the compacted powder mixture also comes into consideration. Before the compacting, 80% of the particles of cobalt have a particle diameter of between 4.4 and 17.5 µm. A value of the particle diameter of between 6.5 and 12 µm is preferred.

In addition, respectively between 0% by weight and 40% by weight of the starting material can be formed by hard phases based on iron, cobalt or molybdenum, which are contained in the starting material as an admixture. Each hard phase present in the starting material can therefore form between 0% by weight and 40% by weight of the starting material. Likewise, respectively between 0% by weight and 3% by weight of the starting material can be formed by various solid lubricants, which are contained in the starting material as an admixture. Each solid lubricant present in the starting material can therefore form between 0% by weight and 3% by weight of the starting material. Likewise, respectively between 0% by weight and 5.5% by weight of the starting material can be formed respectively by an admixture of copper, bronze, brass, ferro phosphorus (FeP) and/or graphite. Each of the substances named above can therefore form between 0% by weight and 40% by weight of the starting material. Furthermore, respectively between 0% by weight and 5.5% by weight of the starting material can be formed respectively by a pressing agent and flow improver.

Furthermore, the starting material can contain between 0% by weight and 7% by weight copper. Furthermore, the starting material can contain an iron-based powder. The iron-based powder can, in turn, contain the following constituents: 0 to 3% by weight Cr, 0 to 1.5% by weight Si, 0 to 4% by weight Ni, 0 to 3.5% by weight V, 0 to 2.5% by weight W, 0 to 2.5% by weight Mo. Moreover, the starting material can also have one or more of the following constituents: graphite, MnS, FeP, CaF2, MoS2.

The invention claimed is:

1. A valve seat ring, produced via a powder metallurgy process comprising:
   compacting a powder mixture including 4% by weight to 16% by weight particles of cobalt to form the valve seat ring; and
   sintering the powder mixture after compacting the powder mixture;
   wherein 80% of the particles of cobalt have, before compacting the powder mixture, a particle diameter of approximately 4.4 µm to 17.5 µm;
   wherein the powder mixture further includes an iron-based powder including Cr; and
   wherein the iron-based powder is 0% by weight to 3% by weight Cr.

2. A tribological system, comprising a valve seat ring and a valve body configured to close a valve opening which is surrounded by the valve seat ring, wherein the valve seat ring is produced by a process including:
   compacting a powder mixture including 4% by weight to 16% by weight particles of cobalt to form the valve seat ring; and
   sintering the powder mixture after compacting the powder mixture;
   wherein 80% of the particles of cobalt have, before compacting the powder mixture, a particle diameter of approximately 4.4 µm to 17.5 µm;
   wherein 0% by weight to 5.5% by weight of the powder mixture is formed by at least one of bronze and brass, respectively;
   wherein the powder mixture further includes an iron-based powder including Cr; and
   wherein the iron-based powder is 0% by weight to 3% by weight Cr.

3. The tribological system according to claim 2, wherein a material of the valve body at least one of i) includes X45CrSi-9 and ii) is X45CrSi-9.

4. The tribological system according to claim 2, wherein the valve seat ring is at least one of nitrided and hardened.

5. An internal combustion engine for a motor vehicle, comprising a cylinder head and a tribological system including a valve seat ring and a valve body configured to close a valve opening which is surrounded by the valve seat ring;
   wherein the valve opening and the valve seat ring are disposed on the cylinder head;
   wherein the valve seat ring is produced by a process including:
   compacting a powder mixture including 4% by weight to 16% by weight particles of cobalt to form the valve seat ring; and
   sintering the powder mixture after compacting the powder mixture;
   wherein 80% of the particles of cobalt have, before compacting the powder mixture, a particle diameter of approximately 6.5 µm to 12 µm;
   wherein the powder mixture further includes an iron-based powder including Cr; and
   wherein the iron-based powder is 0% by weight to 3% by weight Cr.

6. The valve seat ring according to claim 1, wherein 0% by weight to 40% by weight of the powder mixture is formed by at least one hard phase based on one of iron, cobalt and molybdenum.

7. The valve seat ring according to claim 1, wherein:
   the powder mixture further includes a plurality of hard phases each of which form 0% by weight to 40% by weight of the powder mixture; and
   the plurality of hard phases are respectively based on at least one of iron, cobalt and molybdenum.

8. The valve seat ring according to claim 1, wherein 0% by weight to 3% by weight of the powder mixture is formed by at least one solid lubricant.

9. The valve seat ring according to claim 1, wherein the powder mixture further includes a plurality of solid lubricants each of which form 0% by weight to 3% by weight of the powder mixture.

10. The valve seat ring according to claim 1, wherein 0% by weight to 5.5% by weight of the powder mixture is formed by at least one of copper, bronze, brass, ferro phosphorus, and graphite, respectively.

11. The valve seat ring according to claim 1, wherein 0% by weight to 7% by weight of the powder mixture is formed by copper.

12. The valve seat ring according to claim 1, wherein 0% by weight to 5.5% by weight of the powder mixture is formed by at least one of a pressing agent and a flow improver, respectively.

13. The valve seat ring according to claim 1, wherein the iron-based powder further includes:
    0% by weight to 1.5% by weight Si;
    0% by weight to 4% by weight Ni;
    0% by weight to 3.5% by weight V;
    0% by weight to 2.5% by weight W; and
    0% by weight to 2.5% by weight Mo.

14. The valve seat ring according to claim 1, wherein the powder mixture further includes at least one of graphite, MnS, FeP, $CaF_2$, and $MoS_2$.

15. The valve seat ring according to claim 1, wherein the particle diameter of 80% of the particles of cobalt, before compacting, is approximately 6.5 μm to 12 μm.

16. The valve seat ring according to claim 1, wherein the valve seat ring is nitrided.

17. The valve seat ring according to claim 1, wherein the valve seat ring is hardened.

* * * * *